US010560140B1

(12) United States Patent
Wu et al.

(10) Patent No.: US 10,560,140 B1
(45) Date of Patent: Feb. 11, 2020

(54) MIMO WIFI TRANSCEIVER WITH ROLLING GAIN OFFSET PRE-DISTORTION CALIBRATION

(71) Applicant: Quantenna Communications, Inc., San Jose, CA (US)

(72) Inventors: Songping Wu, Cupertino, CA (US); Hossein Dehghan, Diablo, CA (US); Abhishek Kumar Agrawal, Fremont, CA (US)

(73) Assignee: QUANTENNA COMMUNICATIONS, INC., San Jose, CA (US)

( * ) Notice: Subject to any disclaimer, the term of this patent is extended or adjusted under 35 U.S.C. 154(b) by 0 days.

(21) Appl. No.: 15/826,632

(22) Filed: Nov. 29, 2017

(51) Int. Cl.
| | |
|---|---|
| *H04B 1/62* | (2006.01) |
| *H04B 1/38* | (2015.01) |
| *H04B 7/0413* | (2017.01) |
| *H04W 84/12* | (2009.01) |

(52) U.S. Cl.
CPC .............. *H04B 1/62* (2013.01); *H04B 1/38* (2013.01); *H04B 7/0413* (2013.01); *H04W 84/12* (2013.01)

(58) Field of Classification Search
USPC ........................................ 375/267, 296, 297
See application file for complete search history.

(56) References Cited

U.S. PATENT DOCUMENTS

| | | | |
|---|---|---|---|
| 2006/0189284 A1* | 8/2006 | Yamawaki | H04B 1/04 455/127.2 |
| 2008/0049868 A1 | 2/2008 | Brobston | |
| 2011/0150130 A1* | 6/2011 | Kenington | H03F 1/3247 375/296 |

(Continued)

FOREIGN PATENT DOCUMENTS

WO   2012168801   12/2012

OTHER PUBLICATIONS

E-R Jeong, S. Choi of Hanbat National University, Korea Advanced Institute of Science and Technology; "A Low Cost Adaptive Digital Predistorter for Linearization of Power Amplifiers in MIMO Transmitters" IEICE Electronics Express, vol. 9, No. 6, 580-585 Mar. 25, 2012.

(Continued)

*Primary Examiner* — Wednel Cadeau
(74) *Attorney, Agent, or Firm* — Maschoff Brennan

(57) ABSTRACT

A MIMO wireless transceiver includes: antennas, components forming transmit and receive chains coupled to the antennas, a signal combiner, and a predistortion calibration circuit. The transmit chain components include: pre-distorter circuits and power amplifiers (PA)s, The pre-distorter circuits each couple to a transmit chain for pre-distorting an associated signal thereon. The PAs are input coupled to a corresponding transmit chain and output coupled to a corresponding antenna. The signal combiner combines the amplified signals from all of the PAs into a combined output signal. The predistortion calibration circuit includes: a chain (Continued)

isolator circuit to isolate a selected amplified signal of a PA within the combined output signal from the signal combiner and an inverter circuit to determine from the selected amplified signal a mathematical inverse of the associated PA's non-linearity; and to provide corresponding pre-distortion parameters to the corresponding pre-distorter circuit,

20 Claims, 3 Drawing Sheets

(56) References Cited

U.S. PATENT DOCUMENTS

2011/0170630 A1 7/2011 Silverman et al.

| 2012/0328050 | A1* | 12/2012 | Bai | H03F 1/3247 |
| | | | | 375/297 |
| 2013/0049858 | A1* | 2/2013 | Wimpenny | H03F 1/0222 |
| | | | | 330/84 |
| 2013/0052964 | A1* | 2/2013 | Husted | H04B 17/11 |
| | | | | 455/73 |

OTHER PUBLICATIONS

L. C. Vieira, N. J. Gomes; "Experimental Demonstration of Digital Predistortion for Orthogonal Frequency-Division Multiplexing-Radio over Fibre Links near Laser Resonance" IET Optoelectron, 2015, vol. 9, Iss. 6, pp. 310-316.

K. Mekechuk, W-J Kim, S.P. Stapleton, Linearizing Power Amplifiers Using Digital Predistortion, EDA Tools and Test Hardware; High Frequency Design Amplifier Linearization pp. 18-27, from Apr. 2004 High Frequency Electronics.

* cited by examiner

MIMO Predistortion Calibration via Rolling Gain Offset

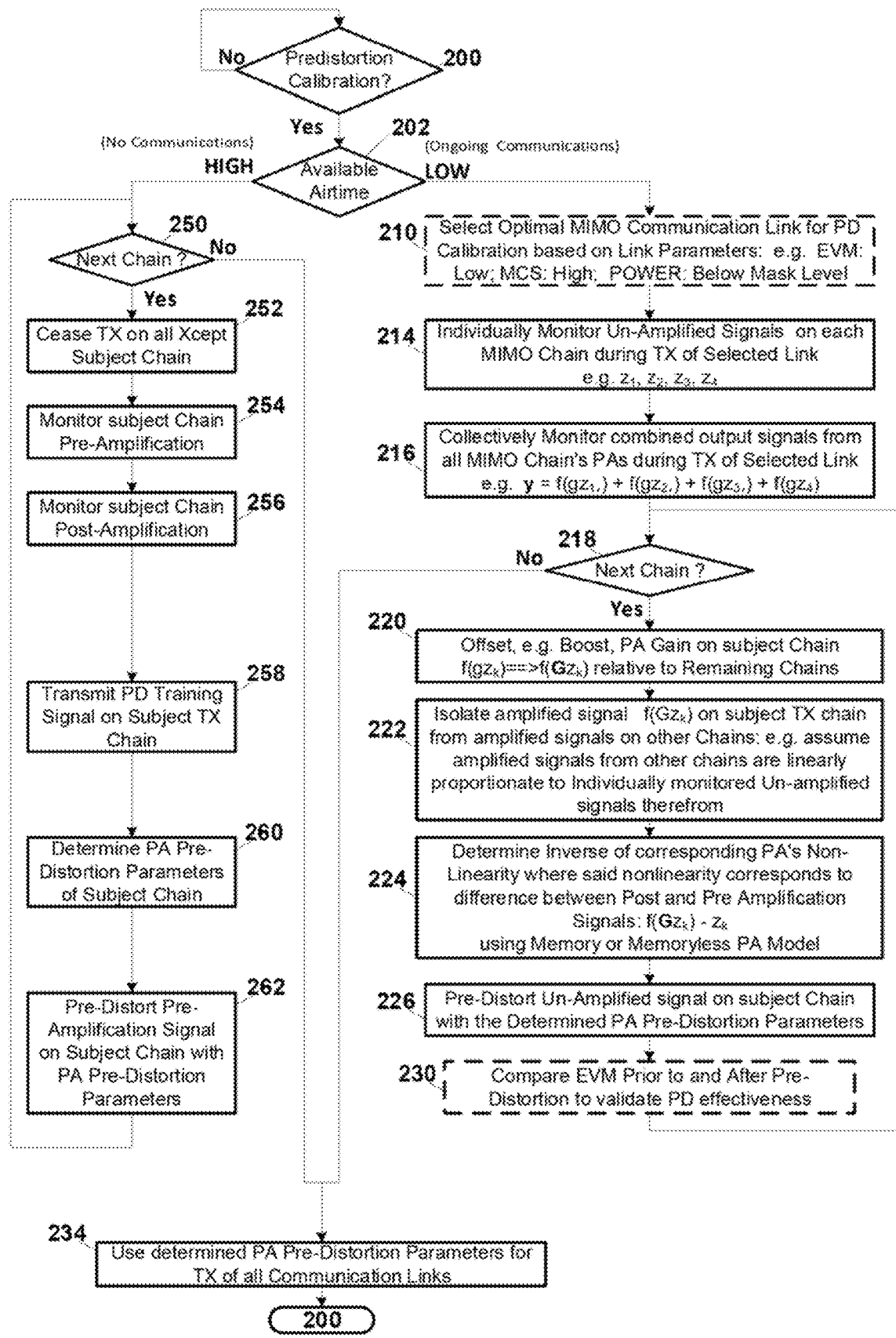
FIG. 2    Method for MIMO Predistortion Calibration

MIMO WIFI TRANSCEIVER WITH ROLLING GAIN OFFSET PRE-DISTORTION CALIBRATION

BACKGROUND OF THE INVENTION

1. Field of Invention

The field of the present invention relates in, general to multiple-input multiple-output (MIMO) wireless transceivers and in particular to methods for pre-distorting transmissions to compensate for non-linearity in the Power Amplifiers on the transmit chains of a MIMO wireless transceiver.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented. e.g. "a", "b", "g", "n", "ac", "ad", "ax". Communications follow a hub and spoke model with a WAP at the hub and the spokes corresponding to the wireless links to each 'client' device.

Communications an the single communication medium are identified as "simplex" meaning, one communication stream from a single source node to one or more target nodes at one time, with all remaining nodes capable of "listening" to the subject transmission. With the adoption in the IEEE 802.11n standard of multiple-input multiple-output (MIMO) communications the communications throughput capacity on the existing spectrum was greatly enhanced MIMO multiplies the capacity of a wireless communication link using multipath propagation between multiple transmit and receive antennas, a.k.a, the MIMO antenna arrays, on the WAP and the station on either end of a communication link.

Starting with the IEEE 802.11ac standard and specifically 'Wave 2' thereof, discrete downlink communications to more than one target node at the same time may take place using what is called Multi-User (MU) MIMO capability of the WAP. The IEEE 802.11ax standard expanded MU MIMO capabilities to include concurrent uplinks from two or more stations to the WAP.

EEE 802.11a/g/n compliant wireless transceivers may have had only a single antenna, a single transmit, and a single receive chain, and a bandwidth limited to a 20MHz channel. An IEEE 802.11ax compliant transceiver may have eight antennas eight transmit chains, eight receive chains and a bandwidth extensible up to a 160MHz channel. Each transmit chain includes a power amplifier (PA) which typically introduces distortion into the MIMO signal transmission. This distortion degrades transmission quality, and throughput.

What is needed are methods for improving the linearity of the transmit
PAs in wireless MIMO transceivers.

SUMMARY OF THE INVENTION

The invention provides a method and apparatus for efficiently calibrating predistortion parameters for each transmit power amplifier on the transmit chains of a multiple-input multiple-output (MIMO) wireless transceiver. The wireless transceiver apparatus includes: a plurality of antennas, a plurality of components forming transmit and receive chains, a signal combiner, and a pre-distortion calibration circuit. The plurality of components are coupled to one another to form transmit and receive chains coupled to the plurality of antenna for MIMO wireless communications on the WLAN. The components forming the transmit chains include: pre-distorter circuits and power amplifiers (PA)s. The pre-distorter circuits are each coupled to a corresponding one of the transmit chains and each accept input of pre-distortion parameters from the pre-distortion calibration circuit for pre-distorting an associated signal of a MIMO communication link prior to amplification thereof. The PAs each have an input and an output, and are each coupled at the input to a corresponding one of the transmit chains and at the output to a corresponding one of the plurality of antennas, to amplify an associated signal of the MIMO communication link for wireless transmission. The signal combiner is coupled to the outputs of each of the PAs to combine the amplified signals therefrom into a combined output signal. The predistortion calibration circuit includes a chain isolator circuit and an inverter circuit. The chain isolator circuit is coupled to the signal combiner, to isolate a selected one of the amplified signals from an associated PA within the combined output signal from the signal combiner. The inverter circuit is coupled to the chain isolator to determine a mathematical inverse of the associated PA's non-linearity where said non-linearity corresponds to a difference between the selected one of the amplified signals and the un-amplified signal on the corresponding one of the transmit chains; and to provide pre-distortion parameters corresponding to said inverse to the corresponding one of the pre-distorter circuits to compensate for any non-linearity in the amplification provided by the corresponding PA.

The invention may be implemented in hardware, firmware, circuits, or software,

Associated Methods are also claimed.

BRIEF DESCRIPTION OF THE DRAWINGS

These and other features and advantages of the present invention will become more apparent to those skilled in the art from the following detailed description in conjunction with the appended drawings in which:

FIG. 2 is a process flow diagram of an embodiment of the processes associated with MIMO pre-distortion calibration,

DETAILED DESCRIPTION OF THE EMBODIMENTS

Figure 1A:
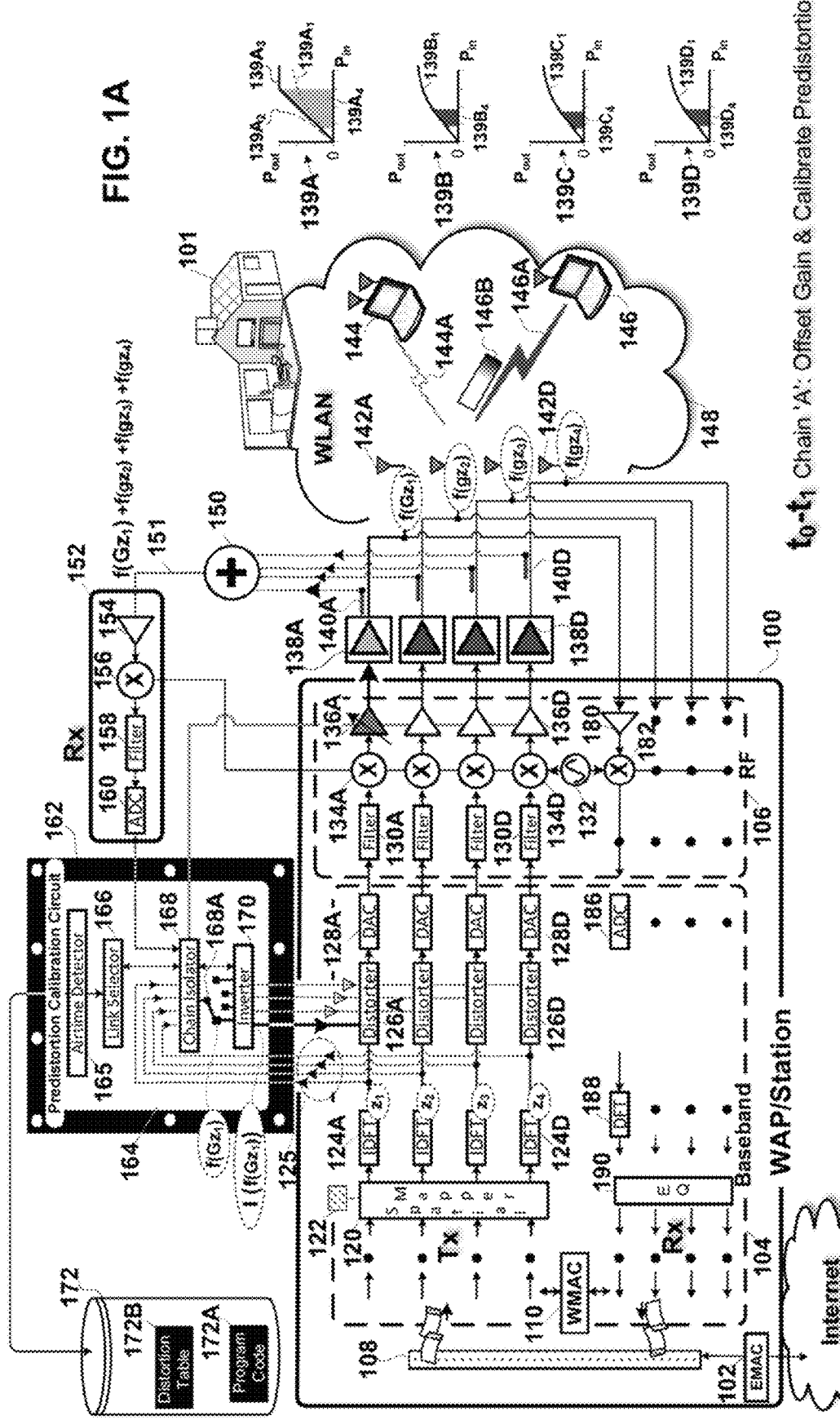
FIGS. 1A-D are successive hardware block diagrams of the MIMO transceiver showing a sequence of rolling gain offsets applied during ongoing MIMO communications to successive transmit chains to calibrate pre-distortion parameters for each of those chains.
Figure 1B:
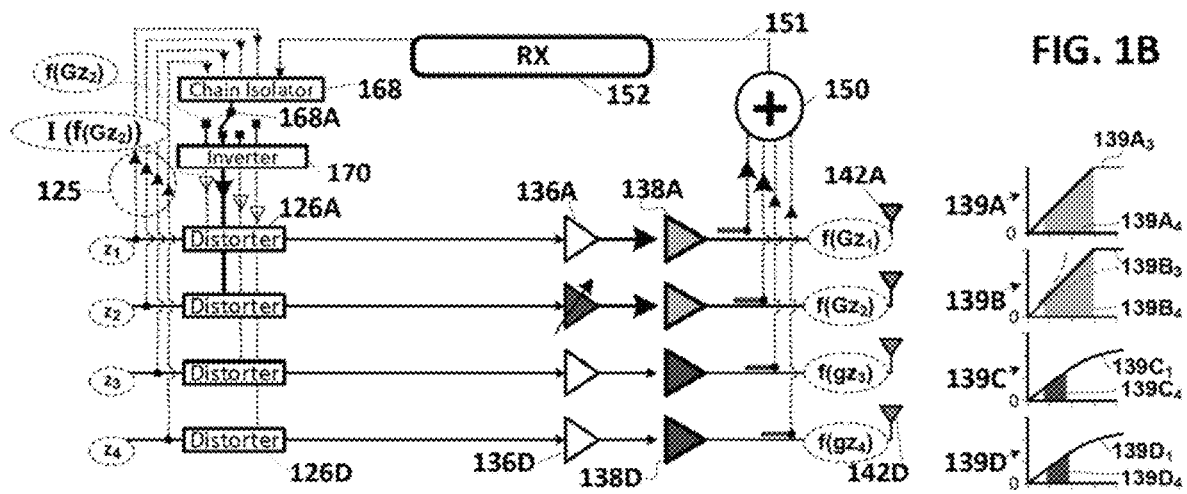
Figure 1C:
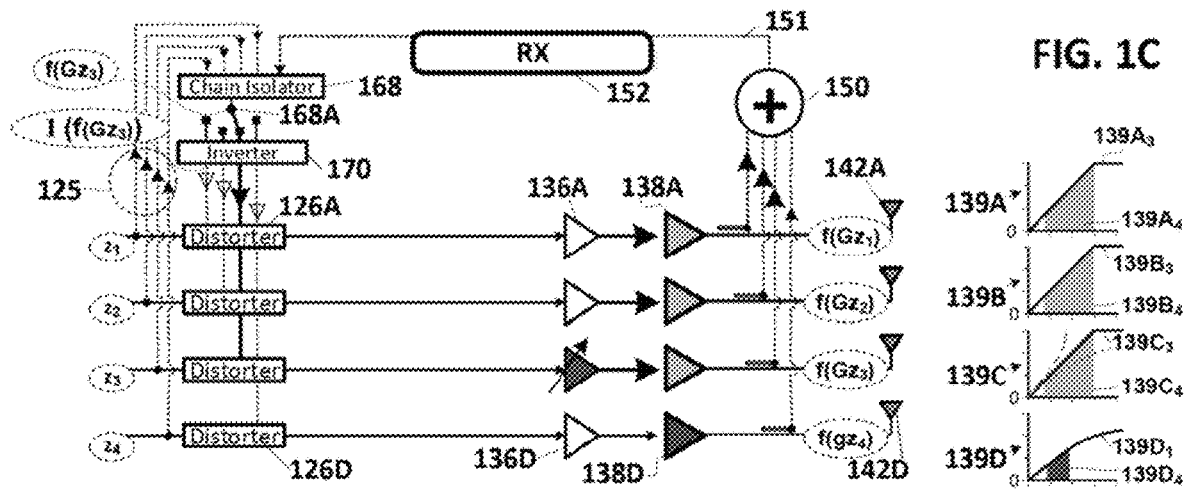
Figure 1D:
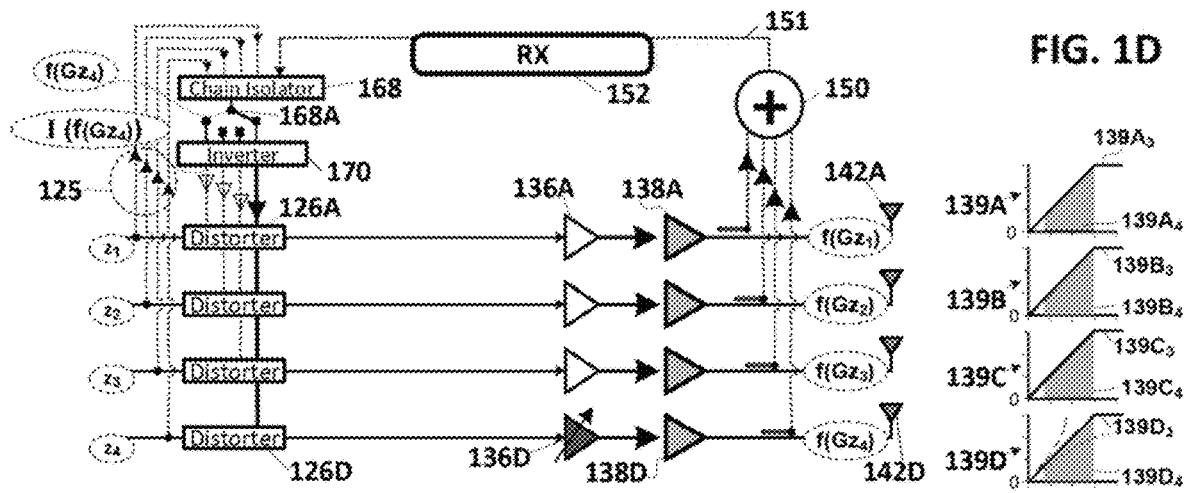

FIGS. 1A-D are successive hardware block diagrams of the MIMO transceiver showing a sequence of rolling gain offsets applied during ongoing MIMO communications to successive transmit chains to calibrate pre-distortion parameters for each of those transmit chains. FIG. 1A shows the pre-distortion calibration of the $1^{st}$ of the 4 transmit chains at time interval $t_0$-$t_1$. FIGS. 1B-D show for successive time intervals, $t_1$-$t_2$, $t_2$-$t_3$, $t_3$-$t_4$, the pre-distortion calibration of the $2^{nd}$, $3^{rd}$, and $4^{th}$ transmit chains respectively.

The gain of the power amplifier(s) for the selected chain is offset relative to the gain on the remaining transmit chains prior to the calibration of pre-distortion parameters for a selected transmit chain. Typically, this offset is accomplished via boosting the gain on the PA(s) of selected chain relative to the remaining chains. Thus, the remaining chains continue to transmit communications in the linear portion of their respective PA's input-output gain profile, while the gain boost for the selected chain moves the amplified communications signal output by the corresponding PA from a linear into a compressed region of the PA's input-output gain profile. As the pre-distortion parameters for the subject and for each subsequent transmit chain are calibrated they are injected into a corresponding digital pre-distorter in the baseband portion of the corresponding transmit chain. The pre-pre-distorter pre-distorts the corresponding signal of the MIMO communication link to compensate for the determined non-linearity in the corresponding power amplifier (PA). The pre-distortion of ongoing communications signals on the selected chain results in a more linear PA input-output gain profile for that chain than would be the case without pre-distortion. After pre-distortion parameters for each MIMO transmit chain in succession have been determined, the process may be repeated as needed to account for any changes in the PA gain profile. The rolling gain offset predistortion calibration is performed during ongoing transmission of wireless communication packets, without interruption of those communications.

FIG. 1A shows the MIMO transceiver 100 operative as a wireless access point (WAP) providing a wireless local area network (WLAN) 148 over communication links 144A and 146A to respectively stations 144 and 146 within home 101. The wireless MIMO transceiver 100 is identified as a 4×4MIMO WAP supporting as many as 4 discrete communication streams over its 4 antennas 142A-D. The wireless MIMO transceiver is shown at time interval $t_0$-$t_1$ transmitting a communication packet 146B to wireless notebook computer station 146 on communication link 146A. The pre-distortion calibration occurs during the transmission of communication packets over communication link 146A. Pre-distortion parameters determined from the calibration performed on one link will be used on other links. Where the transceiver is supporting more than one communication link, then in an embodiment of the invention the highest quality link may be chosen for pre-distortion calibration. For example, link 146A rather than link 144A may be purposely chosen for the pre-distortion calibration based on relative link quality: e.g. error vector magnitude (EVM), modulation coding schema (MCS) and link power.

The MIMO WAP transceiver 100 couples via an Ethernet medium access control (EMAC) interface 102 and modem (not shown) and either a cable, fiber, or digital subscriber line (DSL) backbone connection to the Internet 103. A packet bus 108 couples the EMAC to the MIMO WiFi baseband 104, and the analog front end (AFE) and Radio Frequency (RF) stages 106. In the baseband portion 104 of the WAP wireless communications transmitted to or received from each user/client/station are processed. The baseband portion is dynamically configurable to support single user (SU)-MIMO or multi-user (MU)-MIMO transmission to MU groups of two or more users/stations. The AFE and RF portion 106 handles the upconversion on each of the transmit chains/paths of the wireless transmission initiated in the baseband. The RF portion also handles the downconversion of the signals received on the receive chains/paths and passes them for further processing to the baseband.

TRANSMISSION: The transmit paths/chains include the following discrete and shared components. The WiFi medium access control (WMAC) component 110 includes: hardware queues for each downlink and uplink communication stream; encryption and decryption circuits for encrypting and decrypting the downlink and uplink communication streams; medium access circuit for making the clear channel assessment (CCA), and making exponential random backoff and re-transmission decisions; and a packet processor circuit for packet processing of the communication streams. The WMAC component has a node table which lists each node/station on the WLAN, the station's capabilities, the corresponding encryption key, and the priority associated with its communication traffic. Each sounding or data packet for wireless transmission on the transmit path components to one or more stations is framed; encoded and scrambled followed by demultiplexing and by interleaving and mapping. Next all transmissions are spatially mapped in the spatial mapper 120 with a beamforming matrix 122 for transmission of user data packets subsequent to a sounding. The spatially mapped streams from the spatial mapper are input to Inverse Discrete Fourier Transform (IDFT) components 124A-D for conversion from the frequency to the time domain. Each IDFT is coupled via a corresponding one of pre-distorter circuits 126A-D. In an embodiment of the invention each pre-distorter circuit may implement a Volterra series model for digital predistortion of the signals output by each IDFT. Each pre-distorter 126A-D accepts pre-distortion parameters from the predistortion calibration circuit 164, for pre-distorting the communication signal from the corresponding one of the IDFTs 124A-D to compensate for non-linearity in the corresponding one(s) of the power amplifiers 138A-D. The pre-distorter circuits are coupled to the inputs of the corresponding one of the digital-to-analog converters (DAC)s 128A-D for conversion of the digital signal transmission to analog. The analog signals output by each chain's DAC are passed to the AFE/RF stage 106.

In the AFE/RF stage 106 the analog signals from each DAC are filtered in a corresponding one of filters 130A-D and passed to a corresponding one of upconverters 134A-D. The upconverters are each coupled to a voltage controlled oscillator (VCO) 132 for upconverting the transmission to the appropriate center frequency of the selected channel(s). The upconverted radio frequency (RF) signals on each transmit chain are then subject to on chip amplification in a corresponding one of low voltage power amplifiers 136A-D. Next, the RF signal on each chain is subject to another round of amplification in power amplifier circuits 138A-D the outputs of which couple to the antennas 142A-D.

Directional RF couplers 140A-D monitor the amplified output of each PA 138A-D. The directional couplers 140A-D are coupled to the inputs of summer 150 which combines the amplified signals $f(Gz_1)$, $f(GZ_2)$, $f(Gz_3)$, $f(Gz_4)$ from each PA 138A-D into a combined output signal corresponding in this embodiment of the invention to the sum $f(Gz_1)+f(Gz_2)+f(Gz_3)+f(Gz_4)$ of the amplified signals from all of the PAs 138A-D. The combined output signal is then downconverted and digitized in a dedicated RF receive circuit 152. The RF receive circuit comprises: a low noise amplifier 154, a downconverter 156 coupled to the VCO 132, a filter 158 and an analog-to-digital converter (ADC) 160. The downconverted combined output signal from the RF receive circuit is input to the predistortion calibration circuit 164.

The predistortion calibration circuit 162 determines the pre-distortion parameters for each pre-distorter circuit which compensate for the non-linearity in the input-output gain profile of each power amplifier 140A-D. The pre-distortion calibration circuit injects those parameters into the corresponding pre-distorter circuits 126A-D on each transmit chain. The pre-distortion calibration circuit 164 comprises: an airtime detector circuit 165, a link selector circuit 166 a chain isolator circuit 168 switchably coupled via switch 168A to an inverter circuit 170.

The chain isolator circuit 168 coupled to the signal combiner, to isolate a selected one of the amplified signals from an associated PA within the combined output signal 151 from the signal combiner. The chain isolator achieves this objective by taking the monitored un-amplified individual digital signals 125 $z_{1-4}$ on each transmit chain, scaling them by the gain factor and subtracting from the combined output signal 151 all scaled signals except the signal of interest, which in the example shown in FIG. 1A is the distorted amplified signal on the $1^{st}$ of the 4 transmit chains, i.e. $f(Gz_1)$. The chain isolator passes the distorted signal $f(Gz_1)$ and its unamplified counterpart $z_1$ to the inverter circuit. Switch 168A is shown coupling the output of the chain isolator, through the inverter to the pre-distortion circuit 126A on the $1^{st}$ of the four transmit chains.

The inverter circuit 170 accepts the input from the chain isolator circuit and determines a mathematical inverse of the associated PA's non-linearity, e.g. PA 138A, where said non-linearity corresponds to a difference between the selected one of the amplified signals $f(Gz_1)$ and the unamplified signal $z_1$ on the corresponding one of the transmit chains. The inverter circuit injects pre-distortion parameters corresponding to said inverse $I(f(Gz_1))$ into the corresponding pre-distorter circuit 126A to compensate for any non-linearity in the amplification provided by the corresponding PA 138A. In an embodiment of the invention the inverter circuit stores pre-distortion parameters for each chain in pre-distortion table 172B and uses that history to determine when to re-initiate the pre-distortion calibration process.

In an embodiment of the invention, an airtime detector circuit 165 is provided. The airtime detector circuit couples to the plurality of components forming the transmit and receive chains to determine an amount of airtime required to support ongoing communications of the wireless transceiver apparatus. In an embodiment of the invention this is accomplished by monitoring uplink and downlink communications and determining the amount of time required to support those communications as a percentage of total time. The chain isolator circuit in this embodiment of the invention is responsive to the airtime detector circuit to handle the pre-distortion calibration in either the manner described above when there are ongoing WLAN communications or in an alternate manner when them are no ongoing communications on the WLAN, e.g. in the early morning hours, or before the WLAN has been established. In the case there there are no ongoing WLAN communications, i.e. when the amount of airtime required to support ongoing communications fails below a threshold amount the pre-distortion calibration circuit controls transmission of a pre-distortion training signal/packet on one chain at a time, thereby temporarily avoiding transmissions on all transmit chains other than the corresponding one of the transmit chains. This simplifies the task of the chain isolator, since the combined output signal contains only the contribution from the one chain on which transmission of the training signal/packet is taking place.

In another embodiment of the invention a link selector circuit 166 is provided. The link selector circuit is coupled to the plurality of components forming the transmit and receive chains to select among MIMO communication links, e.g. links 144A and 146A, to each of a plurality of other transceivers 144 and 146 an optimal communication link, e.g. link 146A for determining pre-distortion parameters for each of the PAs. In this embodiment of the invention the highest quality link may be chosen for pre-distortion calibration. For example, link 146A rather than link 144A may be purposely chosen for the pre-distortion calibration based on relative link quality: e.g. error vector magnitude (EVM), modulation coding schema (MCS) and link power. The signal combiner, the chain isolator circuit and the inverter circuit operate during transmission of communication packets 146B for the selected link to determine the pre-distortion parameters for each of the PAs. Those same pre-distortion parameters are then used for pre-distorting communications on all links.

The graphs 139A-D on the righthand side of FIG. 1A show PA input signal power vs the output signal power for PAs 138A-D respectively at the end of the time interval $t_0$-$t_1$. The determination of pre-distortion parameters for the $1^{st}$ of the four transmit chains is shown in graph 139A of I/O power for PA 138A. Three plots are shown in that graph. Plot 139$A_1$ shows highly distorted I/O plot without pre-distortion. Plot 139$A_2$ shows the pre-distortion required to compensate for the PA's nonlinearity. Plot 139$A_3$ shows the ideal I/O plot after pre-distortion. Once such pre-distortion parameters are determined for the subject chain by the predistortion control circuit 162 and injected into the corresponding pre-distorter 126A the breadth of the linear performance region 139$A_4$ for that PA is increased thus increasing the fidelity and throughput capability of the $1^{st}$ of the four transmit chains. The I/O power graphs 139B-D for respectively the remaining $2^{nd}$-$4^{th}$ TX chains have highly distorted I/O plots 139$B_1$, 139$C_1$, 139$D_1$ and narrow regions 139$B_4$, 139$C_4$, 139$D_4$, of linear performance.

RECEPTION: Transceiver 100 includes an equal number of MIMO receive chains. Received communications on the transceiver's array of MIMO antenna 142A-D are subject to RF processing including downconversion in the AFE-RF stage 106. There are four receive paths each including the following discrete and shared components: low noise amplifiers (LNA)s 180 for amplifying the received signal, downconverters 182 coupled to the VCO 132 for downconverting the received signals, filters (not shown), and analog-to-digital converters (ADC) 186 for digitizing the downconverted signals. The digital output from each ADO is passed to a corresponding one of the; discrete Fourier transform (DFT) components 188 on each chain in the baseband portion 104 of the WiFi stage for conversion from the time to the frequency domain.

Receive processing in the baseband stage includes the following shared and discrete components: an equalizer 190 to mitigate channel impairments which is coupled to the output of the DFTs 188. The received streams at the output of the equalizer are subject to demapping and deinterleaving in a corresponding number of the demapper/deinterleavers (not shown). Next the received stream(s) are decoded and descrambled in the decoder and descrambler component (not shown), followed by de-framing in the deframer (not shown). The received communication is then passed to the WMAC component 110 where it is placed in the appropriate upstream hardware queue for upload to the Internet.

FIG. 1B shows the pre-distortion calibration of the $2^{nd}$ of the 4 transmit chains at time interval $t_1$-$t_2$. The chain isolator circuit 168 isolate the selected amplified signal $f(Gz_2)$ from PA 138B within the combined output signal 151 from the signal combiner 150. The chain isolator takes the monitored un-amplified individual digital signals 125 $z_{1-4}$ on each transmit chain, scales them by the gain factor and subtracts the resultants from the combined output signal 151 to obtain the distorted amplified signal on the $2^{nd}$ of the 4 transmit chains, i.e. $f(Gz_2)$. The chain isolator passes the distorted signal $f(Gz_2)$ and its unamplified counterpart $Z_2$ to the inverter circuit. Switch 168A is shown coupling the output of the chain isolator, through the inverter to the pre-distortion circuit 126B on the $2^{nd}$ of the four transmit chains.

The inverter circuit 170 accepts the input from the chain isolator circuit and determines the mathematical inverse of the associated PA's non-linearity, e.g. PA 138B, where said non-linearity corresponds to a difference between the selected one of the amplified signals $f(Gz_2)$ and the un-amplified signal $z_2$ on the corresponding transmit chain. The inverter circuit injects pre-distortion parameters corresponding to said inverse $I(f(Gz_2))$ into the corresponding pre-distorter circuit 126B to compensate for any non-linearity in the amplification provided by the corresponding PA 138B, The graphs 139A-D on the righthand side of FIG. 1B show PA I/O signal power for PAs 138A-D respectively at the end of the time interval $t_1$-$t_2$. The determination of pre-distortion parameters for the $2^{nd}$ of the four transmit chains is shown in graph 139B of I/O power for PA 138B. Plot 139B$_3$ shows the ideal I/O plot after pre-distortion. Once such pre-distortion parameters are determined for the subject chain by the predistortion control circuit 162 and injected into the corresponding pre-distorter 126B the breadth of the linear performance region 139B$_4$ for PA 138B is increased. The I/O power graphs 139C-D for respectively the remaining $3^{rd}$-$4^{th}$ TX chains have highly distorted I/O plots 139C$_1$, 139D$_1$, and narrow regions 139C$_4$, 139D$_4$, of linear performance.

FIG. 1C shows the pre-distortion calibration of the $3^{rd}$ of the 4 transmit chains at time interval $t_2$-$t_3$. The chain isolator circuit isolates the selected amplified signal $f(Gz_3)$ from PA 138C within the combined output signal 151. The chain isolator takes the monitored un-amplified individual digital signals 125 $z_{1-4}$ on each transmit chain, scales them by the gain factor and subtracts from the combined output, signal 151 all scaled signals except the signal of interest, to obtain the distorted amplified signal on the $3^{rd}$ of the 4 transmit chains, i.e. $f(Gz_3)$. The chain isolator passes the distorted signal $f(Gz_3)$ and its unamplified counterpart $z_3$ to the inverter circuit. Switch 168A is shown coupling the output of the chain isolator, through the inverter to the pre-distortion circuit 126C on the $3^{rd}$ of the four transmit chains.

The inverter circuit 170 accepts the input from the chain isolator circuit and determines the mathematical inverse of the associated PAs non-linearity, e.g. PA 138C, where non-linearity corresponds to a difference between the selected one of the amplified signals $f(Gz_3)$ and the un-amplified signal $z_3$ on the corresponding transmit chain. The inverter circuit injects pre-distortion parameters corresponding to said inverse $I(f(Gz_3))$ into the corresponding pre-distorter circuit 126C to compensate for any non-linearity in the amplification provided by the corresponding PA 138C.

The graphs 139A-D on the righthand side of FIG. 1C show PA I/O signal power for PAs 138A-D respectively at the end of the time interval $t_2$-$t_3$. The determination of pre-distortion parameters for the $3^{rd}$ of the four transmit chains is shown in graph 139C of I/O power for PA 138C. Plot 139C$_3$ shows the ideal I/O plot after pre-distortion. Once such pre-distortion parameters are determined for the subject chain by the predistortion control circuit 162 and injected into the corresponding pre-distorter 126C the breadth of the linear performance region 139C$_4$ for PA 138C is increased. The I/O power graph 139D for the remaining $4^{th}$ TX chain has highly distorted I/O plot 139D$_1$, and narrow region 139D$_4$, of linear performance.

FIG. 1D shows the pre-distortion calibration of the $4^{th}$ of the 4 transmit chains at time interval $t_3$-$t_4$. The chain isolator circuit isolates the selected amplified signal $f(Gz_4)$ from PA 138D within the combined output signal 151. The chain isolator takes the monitored un-amplified individual digital signals 125 $z_{1-4}$ on each transmit chain, scales them by the gain factor and subtracts from the combined output signal 151 all scaled signals except the signal of interest, to obtain the distorted amplified signal on the $4^{th}$ of the 4 transmit chains, i.e. $f(Gz_4)$. The chain isolator passes the distorted signal $f(Gz_4)$ and its unamplified counterpart $z_4$ to the inverter circuit. Switch 168A is shown coupling the output of the chain isolator, through the inverter to the pre-distortion circuit 126C on the $4^{th}$ of the four transmit chains.

The inverter circuit 170 accepts the input from the chain isolator circuit and determines the mathematical inverse of the associated PA's non-linearity, e.g. PA 138D, where said non-linearity corresponds to a difference between the selected one of the amplified signals $f(Gz_4)$ and the un-amplified signal $z_4$ on the corresponding transmit chain. The inverter circuit injects pre-distortion parameters corresponding to said inverse $I(f(Gz_4))$ into the corresponding pre-distorter circuit 126D to compensate for any non-linearity in the amplification provided by the corresponding PA 138D.

The graphs 139A-D on the righthand side of FIG. 1D show PA I/O signal power for PAs 138A-D respectively at the end of the time interval $t_3$-$t_4$. The determination of pre-distortion parameters for the $4^{th}$ of the four transmit chains is shown in graph 139D of I/0 power for PA 138D. Plot 139D$_3$ shows the ideal I/O plot after pre-distortion. Once such pre-distortion parameters are determined for the subject chain by the predistortion control circuit 162 and injected into the corresponding pre-distorter 126D the breadth of the linear performance region on 139D$_4$ for PA 138D is increased. The above described rolling gain offset successively across each of the transmit chains allows pre-distortion calibration to take place during ongoing communications without interrupting those communications. Recalibration may take place as circumstances dictate.

In an embodiment of the invention the pre-distortion control circuit 164 is instantiated by processor circuit 162 running program code 172A stored in non-volatile storage 172.

FIG. 2 is a process flow diagram of an embodiment of the processes associated with MIMO pre-distortion calibration. In decision process 200 a determination is made that pre-distortion calibration is required. Control is then passed to decision process 202 in which a determination is made as to available airtime. Available airtime is airtime that is not required for ongoing communications. If there are ongoing communications, i.e. if available airtime is low, then control passes to the rolling gain offset predistortion calibration processes on the right side of FIG. 2 in which pre-distortion calibration takes place during ongoing communications of the transceiver. Alternately, if in decision process 202 a determination is made that there is a high level of available airtime, e.g. after midnight and in the early morning hours before the household awakes, or when the WLAN has is first being set up, then control passes to dedicated transmit chain predistortion calibration processes on the left side of FIG. 2 in which no ongoing communication takes place, and further in which pre-distortion training packets/signals are transmitted exclusively for the purpose of pre-distortion calibration and not for communication, and further on only one chain at a time, and with no transmissions at all on any of the other chains.

The first of the processes associated with roiling gain offset pre-distortion calibration during ongoing communications as shown on the right side of FIG. 2, is optional process 210. In optional process 210 where the transceiver operates as a WAP with multiple communication links to corresponding associated stations, an optimal MIMO communication link is selected for pre-distortion calibration. This selection process may be based on link parameters such as: error vector magnitude (EVM), modulation and coding schema (MCS) or output power level on the PAs. Typically, the optimal link will be one with relatively lower EVM, relatively higher MCS, and with a transmit power level below any mask level proscribed by the relevant standard body, e.g. IEEE or ITU. These selection criteria result in the choice of a link for pre-distortion calibration that exhibits the most linear behavior and thus can be distorted one chain at a time into a non-linear region without interrupting or significantly degrading ongoing communications. Control is then passed to process 214 in which un-amplified digital baseband signals, e.g. $z_1$, $z_2$, $z_3$, $z_4$, on each MIMO chain are monitored during ongoing communication packet transmissions for the selected link. Next in process 216 the combined amplified radio frequency (RF) signals on each chain are collectively monitored during ongoing transmission of communications on the selected link. e.g. $y=f(gz_1,)+f(gz_2,)+f(gz_3,)+f(gz_4)$. Next in decision process 218 the rolling gain offset of each chain in succession takes place from the first to the last of the HMO chains until the pre-distortion parameters for each chain have been determined during ongoing communications. As each chain is selected control passes to process 220. In process 220 the amount of gain offset for the subject chain, e.g, the $k^{th}$ chain, is determined. This typically involves a boost in gain $f(gz_k) \Longrightarrow f(Gz_k)$ relative to the remaining chains for which pre-distortion parameters have not yet been calibrated or r-calibrated. Control is then passes to process 222 in which the amplified signal $f(Gz_k)$ on subject transmit chain is isolated from the amplified signals on all other chains. This process is based on the assumption that the amplified signals from other chains are linearly proportionate to individually monitored un-amplified signals therefrom. In other words, although all chains are transmitting, only the subject chain has had a gain boost which boosts the amplified signal output by the corresponding power amplifier into a compressed region of the I/O graph for that PA. Next in process 224 the pre-distortion parameters for the subject chain are determined as an inverse of corresponding PA's non-linearity, where said non-linearity corresponds to difference between the post amplified signal and pre-amplified signals, e.g. $f(Gz_k)-z_k$ is determined using either a memory or memoryless model of power amplifier performance. Control is then passed to process 226 in which the un-amplified signal on the subject chain is pre-distorted with the pre-distortion parameters determined in the prior process. Control is then passed to optional process 230 in which the EVMs on the subject chain before and after pre-distortion are compared to evaluate the effectiveness of the pre-distortion. Control is then passed back: to decision process 218 to determine if there is another transmit chain for which the pre-distortion parameters need to be calculated. When all chains have been calibrated control is passed to process 234. In process 234 the pre-distortion parameters as determined for the selected link are used for subsequent transmissions on all links supported by the transceiver. Control is then returned to decision process 200.

The first of the processes associated with dedicated transmit chain predistortion calibration in the absence of any communications as shown on the left side of FIG. 2, is decision process 250. In decision process 250 a dedicated transmit chain is chosen for pre-distortion calibration during which interval any transmission on the other transmit chains is terminated in process 252. Thus, there are no transmissions on any of the other chains while one of the chains is undergoing pre-distortion calibration. Control is then passed to process 254 in which the un-amplified digital baseband signal on the subject chain only, is monitored. Then in process 256 the amplified signal on the subject chain's PA is monitored. Next, in process 258 a pre-distortion training signal is transmitted on the subject transmit chain. Then in process 260 the pre-distortion parameters for the power amplifier on the subject transmit chain are determined using the monitored signals. Next control is passed to process 262 in which the pre-distortion parameters for the subject chain are injected into the corresponding pre-distortion circuit for that chain. Control is then passed back to decision process 250 to determine if there is another transmit chain for which the pre-distortion parameters need to be calculated. When all chains have been calibrated control is passed to process 234. In process 234 the pre-distortion parameters as determined are used for subsequent transmissions by the transceiver. Control is then returned to decision process 200.

EXAMPLE

The pre-distortion calibration shown on the right side of FIG. 2 involves the following mathematical determinations. The amplified outputs of all the PAs are summed together at the input of the dedicated receiver 152 as shown in the following Equation 1:

$$y(n) = \sum_{i=0}^{M-1} g_i x_i(n) + w(n) \qquad \text{Equation 1}$$

where: M is the # of antennas. The following Eq. 2 expresses the transmitted signal amplified with constant gain from original signal $z_i(n)$.

$$x_i(n)=g[z_{i_c}n)] \qquad (2)$$

When $x_i(n)=az_i(n)$, Equation 1 reduces to a linear function. Where $g_i$ is the feedback attenuation for each transmit chain/path, and w(n) is the AWGN noise. For chain index k=0 to chain index M-1 where M is the total number of MIMO antenna in the array:

1) Alter the PA gain for the $k^{th}$ path so that non-linearity shows up as shown in the following Eq. 3:

$$x_k(n)=p_k(z_k(n)), \qquad (3)$$

where $p_k(\ldots)$ is a nonlinear function from the RF portion of the transmit chain.

2) All the other chains/paths will be kept the same.

3) The dedicated receiver 152 Rx learns all the knowledge of $x_i(n)$, and will substract from $y(n)$ everything but $x_k(n)$, which is the distorted version of $z_k(n)$ as shown in the following Eq. 4:

$$r(n) = y(n) - \sum_{i=0, i! = k}^{M-1} g_i x_i(n) \qquad \text{Equation 4}$$

4) Work on the inverse function $z(n)=f(r(n))$, using its known input $r(n)$ and $z(n)$. The solution can be given using parametric model, such as, Volterra model, as shown in the following Eq. 5:

$$z(n) = \sum_{m=0}^{M-1} h_1(m) r(n-m) + \qquad \text{Equation 5}$$
$$\sum_{m_1=0}^{M-1} \sum_{m_2=0}^{M-1} \{h_2(m_1, m_2) x(n-m_1) x(n-m_2)\} + \ldots +$$
$$\sum_{k=1}^{Q} \sum_{m_1 \infty 0}^{M-1} \ldots \sum_{m_k \infty 0}^{M-1} \left\{ h_k(m_1, \ldots, m_k) \prod_{j=1}^{k} x(n-m_j) \right\},$$

where Q and M indicates order of nonlinearities and the memory length respectively, $h_k(m_1, \ldots, m_k)$ is the $k^{th}$ order coefficient we are trying to estimate. Or simply use the non-parametric model, such as a look-up table, checking for everything: input amplitude, the output amplitude and or phase.

5) Apply the estimated model at the input to the $k^{th}$ chain/path in the baseband.

6) Go back to step 1, increase the power for $(k+1)^{th}$ path, and keep all the paths the same power as in step 2. This occurs right before the next round of packet transmission.

7) Go through step 3-6 again, until all data chains/paths k=0, . . . , M-1 are iterated and pre-corrected in the baseband. The pre-distortion calibration enables higher transmit power, increased link throughput, and improved efficiency in the MIMO communications of the transceiver.

The components and processes disclosed herein may be implemented in software, hardware, firmware, or a combination thereof including program code software, a memory element for storing the program code software and a hardware processor including registers, logic, and transistor gates for executing the program code software, without departing from the scope of the claimed Invention.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A wireless multiple-input multiple-output (MIMO) transceiver apparatus for wireless communication on a wireless local area network (WLAN), and the wireless MIMO transceiver apparatus comprising:

a plurality of antennas;

a plurality of components coupled to one another to form transmit and receive chains coupled to the plurality of antenna for MIMO wireless communications on the WLAN, the plurality of components forming the transmit chains including:

pre-distorter circuits each coupled to a corresponding one of the transmit chains and each accepting input of pre-distortion parameters for pre-distorting an associated signal of a MIMO communication link prior to amplification thereof; and power amplifiers (PA)s each having an input and an output, and each coupled at the input to a corresponding one of the transmit chains and at the output to a corresponding one of the plurality of antennas, to amplify an associated signal of the MIMO communication link for wireless transmission;

a signal combiner coupled to the outputs of each of the PAs to combine the amplified signals therefrom into a combined output signal; and a predistortion calibration circuit to calibrate pre-distortion parameters for each of the pre-distorter circuits from the combined output signal, the predistortion calibration circuit having an input simultaneously coupled through the signal combiner to the outputs of all of the PAs, and including:

a chain isolator circuit coupled to the signal combiner, to isolate a selected one of the amplified signals from an associated PA within the combined output signal from the signal combiner; and an inverter circuit coupled to the chain isolator circuit to determine a mathematical inverse of the associated PA's non-linearity where said non-linearity corresponds to a difference between the selected one of the amplified signals and the un-amplified signal on the corresponding one of the transmit chains; and to provide pre-distortion parameters corresponding to said inverse to the corresponding one of the pre-distorter circuits to compensate for any non-linearity in the amplification provided by the corresponding PA.

2. The wireless MIMO transceiver apparatus of Claim 1, further comprising:

the chain isolator circuit to boost a gain of the associated PA and to isolate the selected one of the amplified signals subsequent to said boost.

3. The wireless MIMO transceiver apparatus of Claim 1, further comprising:

the chain isolator circuit to isolate in succession the amplified signals on each of the transmit chains; and the inverter circuit to determine the mathematical inverse of each of the associated PA's non-linearity and to provide the resultant predistortion parameters to each corresponding one of the pre-distorter circuits, to increase a linearity of the amplification provided by all of the PAs.

4. The wireless MIMO transceiver apparatus of Claim 1, further comprising:

the signal combiner, the chain isolator circuit, and the inverter circuit operative during transmission of communication packets by the wireless MIMO transceiver, thereby avoiding interruption of ongoing communications.

5. The wireless MIMO transceiver apparatus of Claim 1, further comprising:

a link selector circuit coupled to the plurality of components forming the transmit and receive chains to select among MIMO communication links to each of a plurality of other transceivers communicatively coupled to the wireless MIMO transceiver apparatus an optimal communication link for determining pre-distortion parameters for each of the PAs; and the signal combiner, the chain isolator circuit, and the inverter circuit operative during transmission of communication packets for the selected link.

6. The wireless MIMO transceiver apparatus of Claim 1, further comprising:

an airtime detector circuit coupled to the plurality of components forming the transmit and receive chains to determine an amount of airtime required to support ongoing communications of the wireless MIMO transceiver apparatus; and the chain isolator circuit responsive to a determination by the airtime detector circuit that the amount of airtime required to support ongoing communications falls below a threshold amount, to isolate the selected one of the amplified signals from the corresponding one of the transmit chains by temporarily avoiding transmissions on all transmit chains other than the corresponding one of the transmit chains.

7. The wireless MIMO transceiver apparatus of Claim 1, wherein the signal combiner further comprises:

a summer coupled to the outputs of the PAs to sum the amplified signals at the outputs into the combined output signal.

8. The wireless MIMO transceiver apparatus of Claim 1, further comprising:

a radio frequency (RF) receiver circuit coupled between the signal combiner and the chain isolator circuit to downconvert the combined output signal.

9. The wireless MIMO transceiver apparatus of Claim 1, operative as one of:

a Wireless Access Point (WAP) transceiver or a station transceiver.

10. The wireless MIMO transceiver apparatus of Claim 1, wherein the PAs further comprise:

a pair of PA electrically coupled to one another in series on each transmit chain to amplify the associated signal of the MIMO communication link for wireless transmission, and wherein a first of the pair of PA includes an adjustable gain and a second of the pair of PA includes a fixed gain.

11. The wireless MIMO transceiver apparatus of Claim 1, wherein the chain isolator circuit is configured to isolate the selected one of the amplified signals from the associated PA within the combined output signal by scaling the associated signals corresponding to non-selected ones of the amplified signals by a gain factor and subtracting the scaled associated signals from the combined output signal.

12. A method for operating a multiple-input multiple-output (MIMO) wireless transceiver having multiple transmit chains each including a corresponding power amplifier (PA) for amplifying associated signals of a MIMO communication link, and the method comprising the acts of:

simultaneously receiving amplified signals from all of the PAs;

combining all of the amplified signals from outputs of all of the PAs into a combined output signal;

isolating a selected one of the amplified signals from an associated PA within the combined output signal;

determining pre-distortion parameters corresponding to a mathematical inverse of the associated PA's non-linearity where said non-linearity corresponds to a difference between the selected one of the amplified signals and an un-amplified signal on the corresponding one of the transmit chains; and pre-distorting the un-amplified signal on the corresponding one of the transmit chains utilizing said mathematical inverse, to compensate for any non-linearity in the amplification provided by the corresponding PA.

13. The method for operating the MIMO wireless transceiver of Claim 12, wherein the isolating act further comprises:

boosting a gain of the associated PA; and isolating the selected one of the amplified signals subsequent to said boost.

14. The method for operating the MIMO wireless transceiver of Claim 12, further comprising:

repeating the isolating, determining, and pre-distorting acts for all transmit chains of the MIMO wireless transceiver.

15. The method for operating the MIMO wireless transceiver of Claim 12, further comprising:

performing the isolating, determining, and pre-distorting acts during transmission of communication packets by the MIMO wireless transceiver, thereby avoiding interruption of ongoing communications.

16. The method for operating the MIMO wireless transceiver of Claim 12, further comprising:

selecting an optimal communication link among all MIMO communication links supported by the wireless transceiver; and performing the isolating, determining, and pre-distorting acts during transmission of communication packets for the selected link.

17. The method for operating the MIMO wireless transceiver of Claim 12, further comprising:

determining an amount of airtime required to support ongoing communications of the wireless transceiver; and isolating the selected one of the amplified signals from the corresponding one of the transmit chains by temporarily avoiding transmissions on all transmit chains other than the corresponding one of the transmit chains, responsive to a determination that the amount of airtime required to support ongoing communications falls below a threshold amount.

18. The method for operating the MIMO wireless transceiver of Claim 12, wherein the combining act further comprises:

summing the amplified signals at the outputs of each of the PAs into the combined output signal.

19. The method for operating the MIMO wireless transceiver of Claim 12, further comprising:

downconverting the combined output signal, and isolating the selected one of the amplified signals from the associated PA within the downconverted combined output signal.

20. The method for operating the MIMO wireless transceiver of Claim 12, further comprising one of the acts of:

operating the MIMO wireless transceiver as a Wireless Access Point (WAP) transceiver; or operating the MIMO wireless transceiver as wireless station transceiver.

* * * * *